United States Patent [19]

Muza et al.

[11] Patent Number: 4,745,706

[45] Date of Patent: May 24, 1988

[54] PLANT WATERING AND FEEDING STAKE

[76] Inventors: Robert Muza; Merry Muza, both of 1621 Cambridge, Kansas City, Mo. 64126

[21] Appl. No.: 918,330

[22] Filed: Oct. 14, 1986

[51] Int. Cl.⁴ .................... A01G 17/06; A01G 17/14
[52] U.S. Cl. .......................................... 47/47; 47/48.5
[58] Field of Search ................ 256/19; 248/530, 539, 248/122, 156, 218.4; 47/33, 27, 48.5, 44–47

[56] References Cited

U.S. PATENT DOCUMENTS

| | | | |
|---|---|---|---|
| 1,025,311 | 5/1912 | Rowell | 47/47 |
| 1,676,337 | 7/1928 | Kruse | 47/47 |
| 1,984,265 | 12/1934 | Hamer | 47/44 X |
| 2,809,468 | 10/1957 | Eliot | 47/44 |
| 2,974,662 | 3/1961 | Forrest | 47/47 |
| 3,345,774 | 10/1967 | Delbuguet | 47/44 X |
| 3,579,908 | 5/1971 | Morgan | 47/45 |

FOREIGN PATENT DOCUMENTS

| | | | |
|---|---|---|---|
| 3009354 | 10/1981 | Fed. Rep. of Germany | 47/47 |
| 2475351 | 8/1981 | France | 47/47 |

*Primary Examiner*—Robert E. Bagwill
*Assistant Examiner*—Danton D. DeMille
*Attorney, Agent, or Firm*—Terry M. Gernstein

[57] ABSTRACT

A plant watering and feeding support combines a gravity feed watering and fertilizing system along with the holding features of a stake. The support, which may be driven into the ground next to a plant, comprises a hollow tube having a plurality of holes in a bottom portion with such holes permitting a slow delivery of water and fertilizer into the soil. Additionally, the plant is attachable to the support by snap-on plastic straps, and the straps are mounted in grooves which permit their movement upwardly along the stake as the associated plant grows.

1 Claim, 3 Drawing Sheets

PLANT WATERING AND FEEDING STAKE

BACKGROUND OF THE INVENTION

1. Field of the Invention

The present invention relates to plant supporting stakes, and more particularly pertains to a new and improved plant supporting stake which provides a self watering and fertilizing function.

2. Description of the Prior Art

Plant watering and feeding devices are known in the prior art. For example, U.S. Pat. No. 2,809,468, which issued to S. Eliot on Oct. 15, 1957, discloses a combination plant prop and feeder which essentially comprises a hollow tube positionable in the soil proximate a plant. Snap-on straps are attachable to the prop and serve to hold the plant in an abutting relationship, while the tube may be filled with water and fertilizer to effect a slow and continual feeding of the plant. The Eliott plant feeder utilizes a single opening at the bottom of the tube for permitting water flow outwardly therefrom, and accordingly, this device would most likely provide an uneven watering and feeding of the plant's roots. Further, no provision is made for accommodating plant growth, whereby apparently the stake would have to be replaced with a larger stake as the associated plant grew.

A more advanced design of a plant watering and feeding device is to be found in U.S. Pat. No. 3,345,774, which issued to R. Delbuguet on Oct. 10, 1967. This device essentially comprises a hollow stake positionable in the soil next to a plant, and includes a plurality of water and fertilizer distributing holes in a bottom portion thereof. The device further includes a top fill cap which permits a filling of the stake with the desired liquid, and also includes a plurality of through-extending apertures along the entire axial length of the stake. These apertures are designed to receive tying cord and the like, for attaching the associated plant to the stake. However, the device is not particularly well adapted for accommodating the growth of a plant, inasmuch as it would be constantly necessary to reattach the plant to the device as the plant increases in size.

As can be appreciated, the above-discussed patents describe plant supporting and feeding stakes which are illustrative of a far larger number of such stakes that are know in the prior art. In this regard, a large number of patents have issued on various modifications of these devices, and apparently, little or no commercial success has been achieved with the designs presently known. Most likely, substantial problems have arisen regarding the manufacture of the stakes, as well as the inability of presently known designs to accommodate plant growth. As such, it would appear that there exists a continuing need for new and improved self watering and feeding stakes which would remove the necessity of continually reattaching the associated plants thereto, and in this respect, the present invention substantially fulfills this need.

SUMMARY OF THE INVENTION

In view of the foregoing disadvantages inherent in the known types of self watering and feeding plant stakes now present in the prior art, the present invention provides an improved self watering and feeding stake that is designed to accommodate plant growth. As such, the general purpose of the present invention, which will be described subsequently in greater detail, is to provide a new and improved self watering and feeding plant stake which has all the advantages of the prior art self watering and feeding plant stakes and non of the disadvantages.

To attain this, the present invention comprises a plastic, tubular-shaped stake which is of a hollow construction and which includes a plurality of apertures on a bottommost portion thereof. The apertures permit the delivery of liquid fertilizer and water into the soil proximate the roots of a plant attached thereto. Additionally, the stake includes integral grooves along an axial length thereof, with snap-on straps being positionable within the grooves for movement upwardly and downwardly along the stake as required. The associated plant can be attached to the straps, with the straps then moving in the grooves to accommodate long term plant growth. Further, the invention includes an integral foot depressor attached to a bottommost portion of the stake, with the foot depressor facilitating a positioning of the stake in the soil.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self watering and feeding plant stake which has all the advantages of the prior art self watering and feeding plant stakes and none of the disadvantages.

It is another object of the present invention to provide a new and improved self watering and feeding plant stake which may be easily and efficiently manufactured and marketed.

It is a further object of the present invention to provide a new and improved self watering and feeding plant stake which is of a durable and reliable construction.

An even further object of the present invention is to provide a new and improved self watering and feeding plant stake which is susceptible of a low cost of manufacture with regard to both materials and labor, and which accordingly is then susceptible of low prices of sale to the consuming public, thereby making such self watering and feeding plant stakes economically available to the buying public.

Still yet another object of the present invention is to provide a new and improved self watering and feeding plant stake which provides in the apparatuses and methods of the prior art some of the advantages thereof, while simultaneously overcoming some of the disadvantages normally associated therewith.

Still another object of the present invention is to provide a new self watering and feeding plant stake which is designed to accommodate long term plant growth.

Yet another object of the present invention is to provide a new and improved self watering and feeding plant stake which is characterized by a transparent construction so as to permit a monitoring of the amount of liquid fertilizer and water contained therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
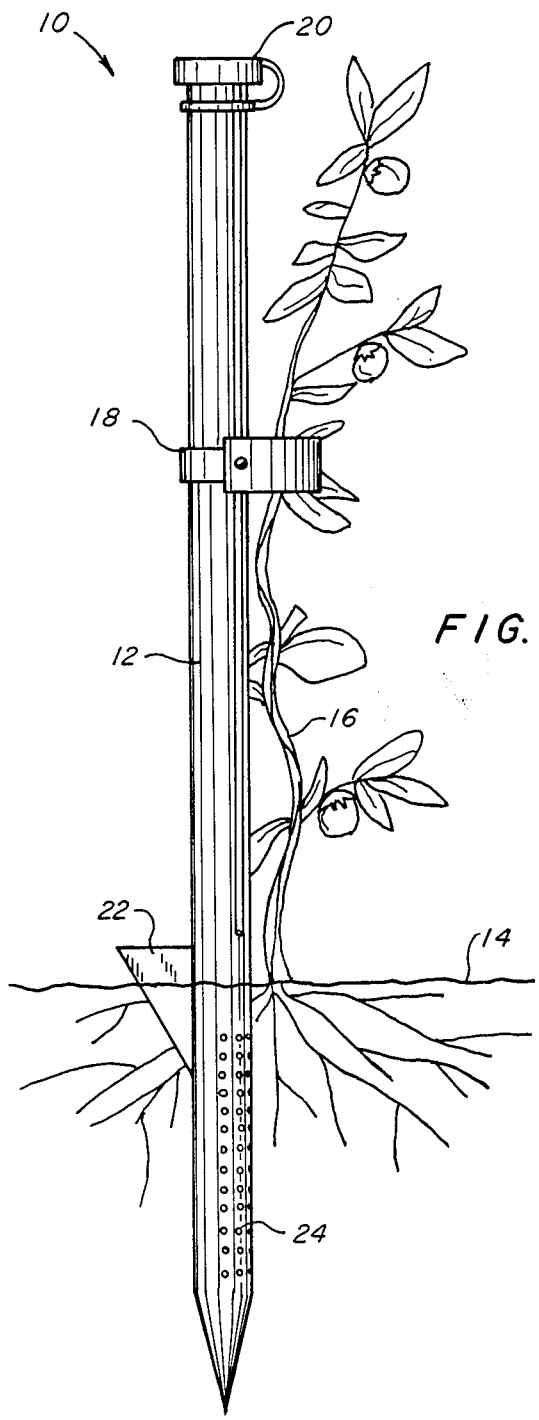
FIG. 1 is a front elevation view of the plant watering and feeding stake comprising the present invention.

With reference now to the drawings, and in particular to FIG. 1 thereof, a new and improved plant watering and feeding stake embodying the principles and concepts of the present invention and generally designated by the reference numeral 10 will be described.

More specifically, it will be noted that the plant watering and feeding stake 10 essentially comprises a hollow tubular plastic member 12 that is positionable in the ground 14 next to a plant 16, such as a tomato plant or the like, so as to perform a plant supporting function. The stake 12 includes at least one slidable plant supporting strap assembly 18, which will be subsequently described in greater detail, and a snap-on cap 20 which facilitates a filling of the tube 12 with liquid fertilizer. Further, the stake 12 includes an integral or otherwise separably attached foot depressor 22, and a plurality of apertures 24 which communicate with the interior hollow portion of the stake. The apertures 24 permit the gravity feed of water and liquid fertilizer from the stake into the soil 14 around the plant 16.

Figure 5:
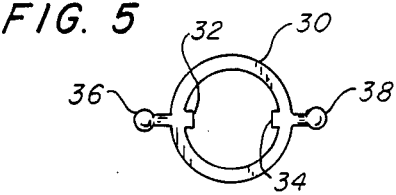
FIG. 5 is a top plan view of the strap supporting ring.
Figure 4:
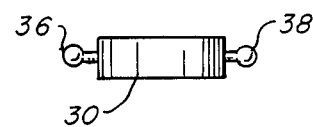
FIG. 4 is a front elevation view of a strap supporting ring forming a part of the present invention.
Figure 2:
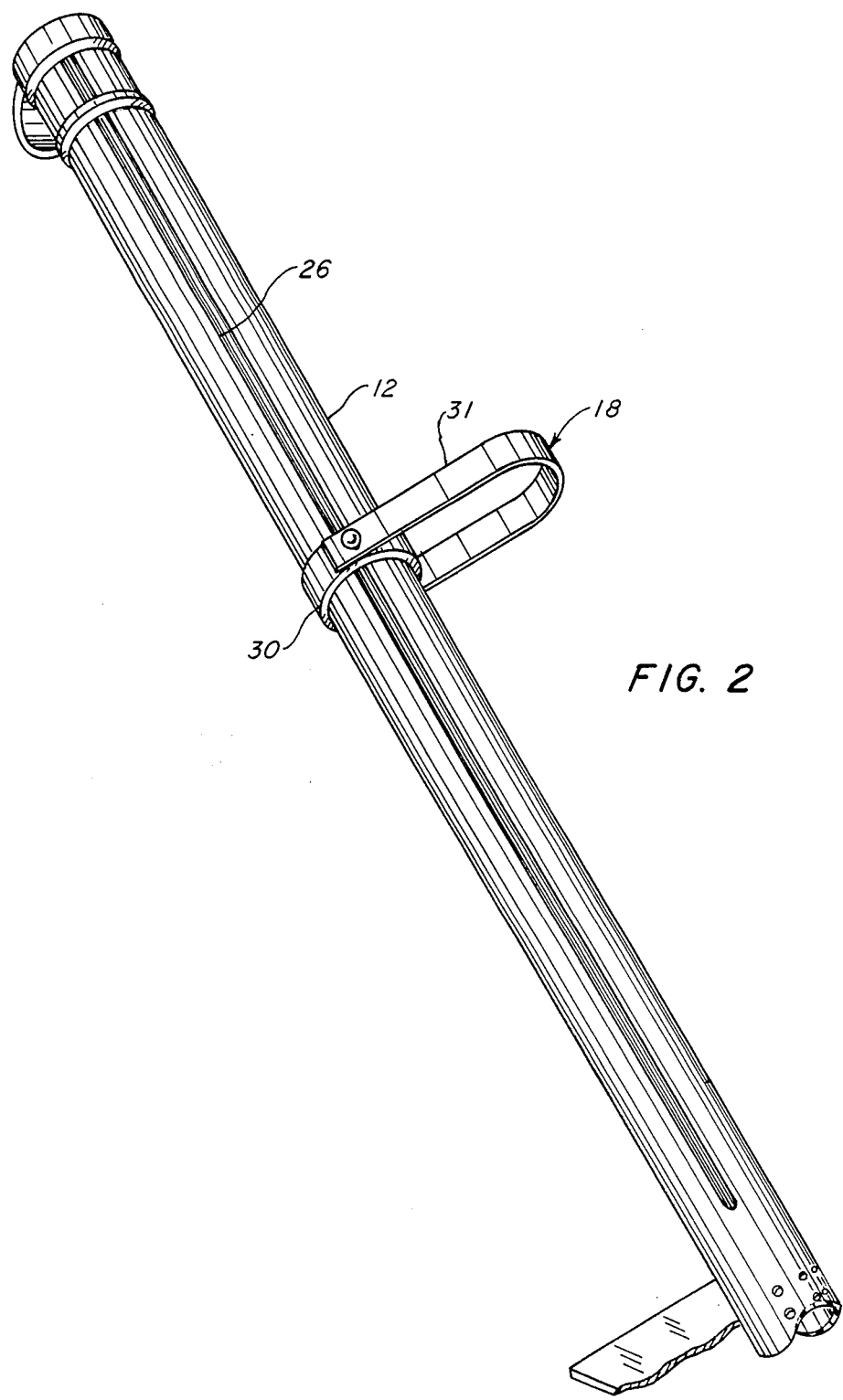
FIG. 2 is a perspective view of the invention.
Figure 3:
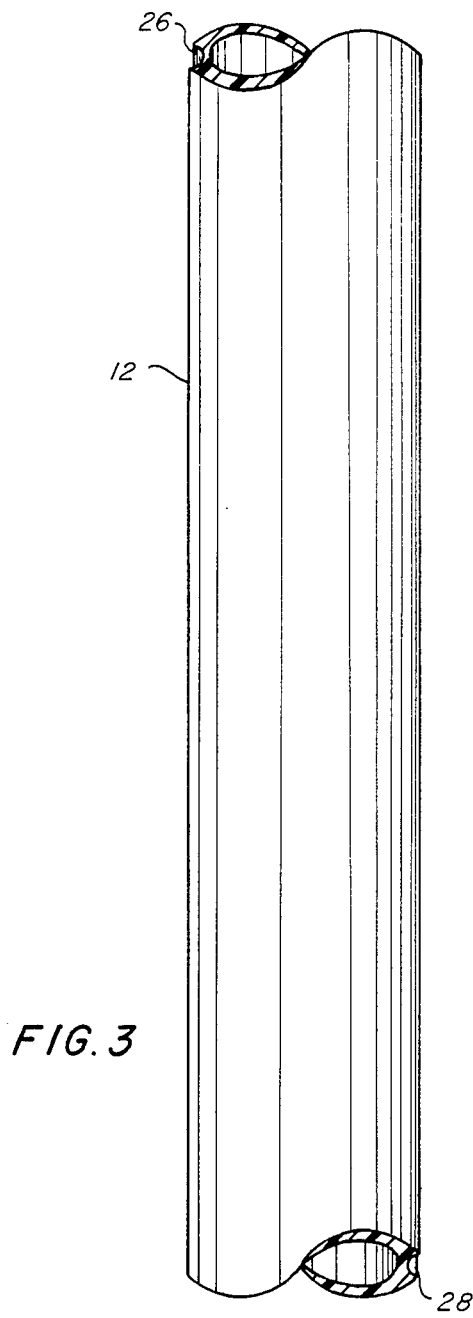
FIG. 3 is a partial elevation view illustrating the tubular portion of the stake.

With reference to the construction of the plant supporting strap assembly 18, reference is next made to FIGS. 2 and 3 of the drawings wherein it can be seen that the tubular stake 12 may include a pair of symmetrical, oppositely disposed grooves 26, 28 positioned along an axial length of the exterior surface of the tube 12. The strap assembly 18 is designed to slidably move up and down along the stake 12 with such movement being guided by the grooves 26, 28. In this regard. FIGS. 4 and 5 illustrate the construction of a strap supporting ring 30 to which a flexible plant supporting strap 31 may be selectively attached. The ring 30 is of a circular design, and includes a pair of oppositely disposed, inwardly extending detents 32, 34 which are respectively slidably positionable within the grooves 26, 28. These detents 32, 34, which are integrally a part of the ring 30, serve to prevent a rotation of the ring around the sake 12, as well as to guide the up and down movement of the plant supporting strap 31 relative to the stake.

Figure 6:
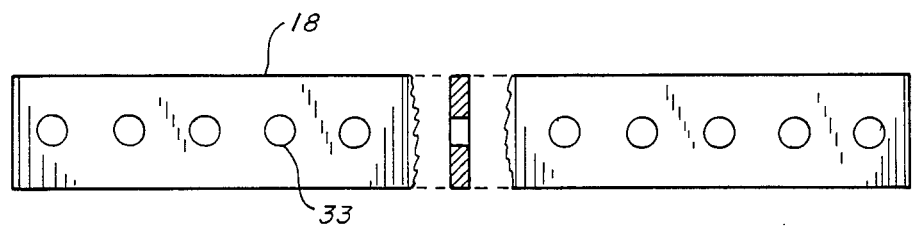
FIG. 6 is a detail view of a flexible plant holding strap forming a part of the present invention.

As further illustrated in FIGS. 4 and 5, the ring 30 includes a pair of oppositely disposed, outwardly extending detents 36, 38 which are integrally a part of the ring and which include bulbous ends for facilitating a snap fit of the plant supporting strap 31 thereto. In this regard, reference is made to FIG. 6 of the drawings wherein a detail view of a flexible plant supporting strap 31 is illustrated. In this connection, the strap 31 may be formed of a flexible plastic and should include a plurality of through-extending apertures 33 spaced along an axial length thereof, with such apertures being of a diameter slightly less than the diameter of the bulbous ends associated with the detents 36, 38, whereby the flexible strap may be snap fitted over the detents. As such, a strap 31 may be adjustably fitted to a ring 30 at a preselected size to accommodate the positioning of a plant 16 next to the stake 12.

Figure 7:
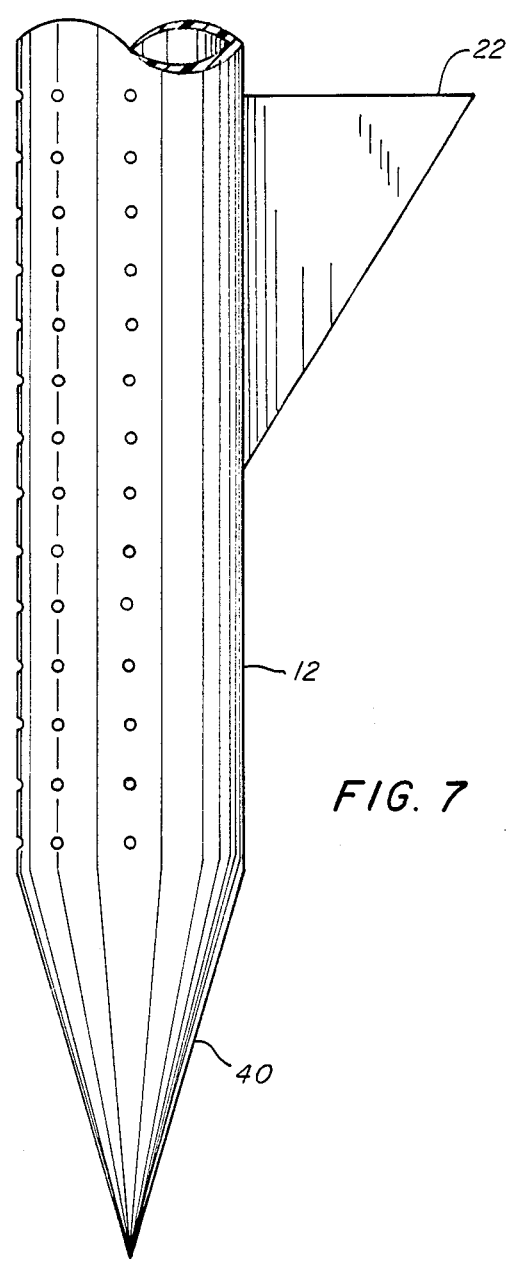
FIG. 7 is a partial elevation view illustrating the bottommost watering portion of the stake.

FIG. 7 of the drawings again illustrates the bottommost portions of the stake 12 wherein it can be seen that the apertures 24 are spaced around the length and breadth of the stake so as to achieve an even distribution of liquid in the soil 14 around a plant 16. As illustrated, the foot depressor 22 is primarily designed to permit a user to apply force thereto, usually by means of his foot, to drive the stake 12 into the soil 14. The stake 12 may include a pointed end 40 to facilitate its forced entry into the soil 14, with this pointed end being either an integral part of the stake, or otherwise separately formed therefrom and attached thereto.

Figure 9:
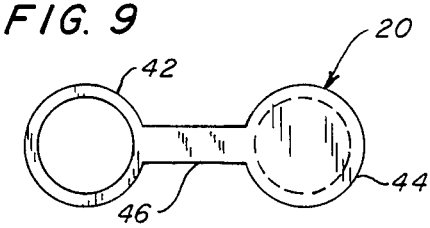
FIG. 9 is a top plan view of the cap.
Figure 8:
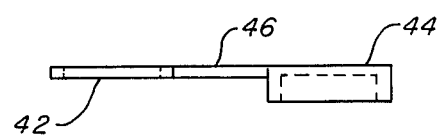
FIG. 8 is a side elevation view of the cap attachable to the topmost portion of the stake.

A final feature of the invention includes the aforementioned snap-on cap 20 which, as best illustrated in FIGS. 8 and 9, may be of an integral design which includes a flexible ring 42 attached to a basic cap 44 by means of an integral strap 46. In this regard, the ring 42 is positionable over the stake 12 in the manner best illustrated in FIGS. 1 and 2, so as to permanently retain the cap 44 in attachment thereto, with the flexible strap portion 46 permitting a removal of the cap 44 from the stake without an attendant danger of losing the cap.

With respect to the manner of usage and operation of the present invention, the same should be clear from the above description; however, a brief description thereof will be provided. More specifically, it can be seen that the stake 12 may be positioned in the soil 14 next to a plant 16 and may be anchored therein by applying force to the foot depressor 22. Once the stake 12 has been positioned next to a plant 16, the plant may be attached to the stake by the flexible strap assembly 18. To effect such an attachment, the ring 30 is moved upwardly within the grooves 26, 28 to the desired location, and a flexible strap 31 is then positioned around the plant 16 and snap fitted to the respective detents 36, 38.

Liquid fertilizer and water may be poured into the interior of the stake 12 by a temporary removal of the cap 44, and the cap may then be replaced to retain the water in the stake. The water and fertilizer will slowly seep through the apertures 24 into the soil 14 so as to continually water and fertilize the plant 16 over a long period of time. As needed, the stake can be refilled by a temporary removal of the cap 44. As the plant 16 grows, the plant supporting strap assembly 18 will move upwardly within the grooves 26, 28 so as to continue its plant supporting function without causing any damage to the plant.

With respect to the above description then, it is to realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant watering and feeding device, comprising:

a. a stake positionable proximate a plant, said stake having a substantially cylindrical shape, said stake having an upper portion and a lower portion, said lower portion terminating in a point in order to facilitate introducing said stake into soil proximate said plant, said stake having a hollow construction for receiving a liquid therein, said stake having a plurality of through extending apertures formed in said lower portion, said apertures providing a means for slowly dispensing said liquid into said soil, said stake having a transparent construction to permit a visual inspection of said stake to determine an amount of said liquid still present in said stake, said stake having at least one groove along an axial length thereof;

b. a foot depressor integrally attached to said stake, said foot depressor providing a structure to which a user of said plant watering and feeding device may apply force in order to aid in introducing said device into said soil;

c. a plant support means attachable between said stake and said plant to effect an attachment of said plant to said stake, said plant support means comprising an adjustable length strap flexibly positionable around said plant, said plant support means further comprising a ring means slidably movable along said stake, said grasp being attachable to said ring means, said ring means being provided with at least one inwardly extending detent positionable within said groove, said ring means being further provided with at least one outwardly extending detent, said strap being selectively attachable to said outwardly extending detent; and d. a cap means, said cap means comprising a flexible ring positionable around said upper portion of said stake, said cap means further comprising a cap positionable over a top end of said stake, said cap being attached to said flexible ring by an integral strap, said strap preventing a loss of said cap when removed from said stake.

* * * * *